(12) United States Patent
Min et al.

(10) Patent No.: US 10,887,518 B2
(45) Date of Patent: Jan. 5, 2021

(54) CAMERA MODULE

(71) Applicant: Samsung Electro-Mechanics Co., Ltd., Suwon-si (KR)

(72) Inventors: Kyoung Joong Min, Suwon-si (KR); Seo Hyung Kim, Suwon-si (KR); Koon Shik Cho, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 16/540,442

(22) Filed: Aug. 14, 2019

(65) Prior Publication Data

US 2020/0120279 A1 Apr. 16, 2020

(30) Foreign Application Priority Data

Oct. 12, 2018 (KR) .................. 10-2018-0121708

(51) Int. Cl.
*H04N 5/232* (2006.01)

(52) U.S. Cl.
CPC ..... *H04N 5/23258* (2013.01); *H04N 5/23287* (2013.01)

(58) Field of Classification Search
CPC ........... H04N 5/23258; H04N 5/23287; H04N 5/2257; H04N 5/2258
See application file for complete search history.

(56) References Cited

U.S. PATENT DOCUMENTS

| 2013/0050536 A1* | 2/2013 | Suzuki | H04N 5/23293 348/240.3 |
| 2013/0169832 A1 | 7/2013 | Park et al. | |
| 2016/0165137 A1* | 6/2016 | Kang | H04N 5/23287 348/208.4 |
| 2017/0126978 A1* | 5/2017 | Yun | H04N 5/23258 |
| 2017/0201684 A1* | 7/2017 | Kang | H04N 5/2258 |
| 2019/0068886 A1* | 2/2019 | Baek | H04N 5/217 |

FOREIGN PATENT DOCUMENTS

| KR | 10-2009-0022672 A | 3/2009 |
| KR | 10-2013-0077216 A | 7/2013 |
| KR | 10-2017-0019753 A | 2/2017 |

* cited by examiner

*Primary Examiner* — Gevell V Selby
(74) *Attorney, Agent, or Firm* — NSIP Law

(57) ABSTRACT

A camera module includes a gyro sensor including a data output port and configured to provide gyro data through the data output port, a first camera module including a first lens barrel, and a first shake corrector configured to provide an optical image stabilization (OIS) function to the first lens barrel and including a first communication pad configured to receive the gyro data, and a second camera module including a second lens barrel, and a second shake corrector configured to provide an OIS function to the second lens barrel and including a second communication pad configured to receive the gyro data, wherein the first communication pad of the first shake corrector and the second communication pad of the second shake corrector are connected in common to the data output port.

23 Claims, 3 Drawing Sheets

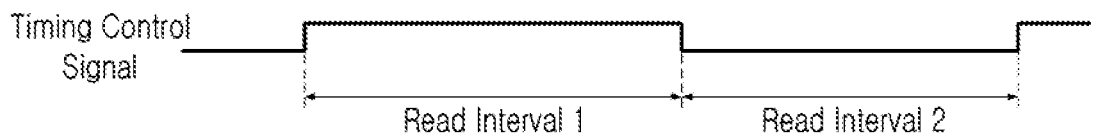
FIG. 3
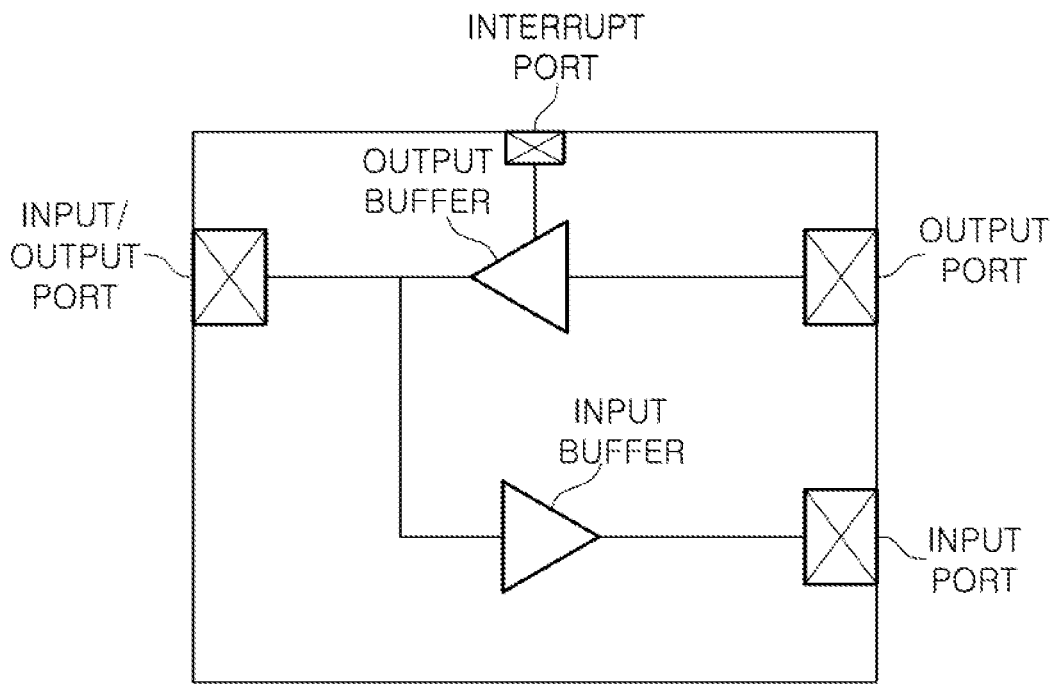
FIG. 4
FIG. 5A
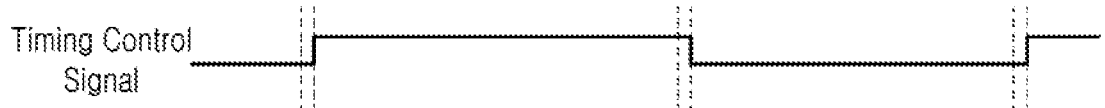
FIG. 5B
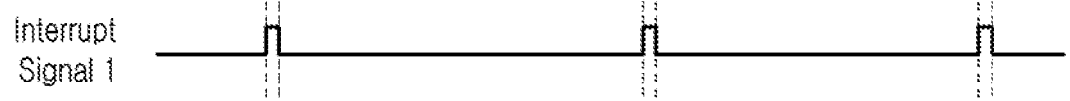
FIG. 5C
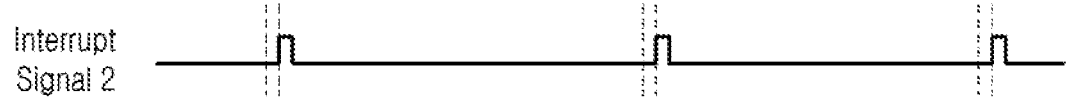

CAMERA MODULE

CROSS-REFERENCE TO RELATED APPLICATIONS

This application claims the benefit under 35 USC 119(a) of Korean Patent Application No. 10-2018-0121708 filed on Oct. 12, 2018, in the Korean Intellectual Property Office, the entire disclosure of which is incorporated herein by reference for all purposes.

BACKGROUND

1. Field

This application relates to a camera module.

2. Description of Related Art

For some time now, a portable communications terminal such as a cellular phone, a personal digital assistant (PDA), or a portable personal computer (PC), has generally been implemented with the capability to transmit video data, as well as text or audio data. In accordance with this trend, a camera module has become a standard feature in portable communications terminals to enable the transmission of video data, video chatting, and other functions involving the transmission of video data.

Generally, a camera module includes a lens barrel having lenses disposed therein, a housing accommodating the lens barrel therein, and an image sensor that converts an image of a subject into an electrical signal. A fixed-focus type camera module capturing an image of an object using a fixed focus may be used as the camera module. However, as camera module technology has developed, a camera module including an actuator capable of autofocusing (AF) has been recently used. In addition, the camera module may include an actuator for optical image stabilization (OIS) to suppress a decrease in resolution due to a user's hand shaking or other movement at the time of capturing an image or a moving picture.

Recently, in order to realize camera functions of high performance, a camera module including a plurality of lens barrels has been mounted in portable electronic devices. In order to suppress a decrease in resolution user's hand shaking or other movement in each of the plurality of lens barrels, an actuator enabling an OIS function needs to be provided for each lens barrel. However, if data from different gyro sensors are input to individual actuators enabling the OIS function, due to differences in characteristics among the gyro sensors, performance variations in the OIS functions may occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a gyro sensor including a data output port and configured to provide gyro data through the data output port; a first camera module including a first lens barrel, and a first shake corrector configured to provide an optical image stabilization (OIS) function to the first lens barrel and including a first communication pad configured to receive the gyro data; and a second camera module including a second lens barrel, and a second shake corrector configured to provide an OIS function to the second lens barrel and including a second communication pad configured to receive the gyro data, wherein the first communication pad of the first shake corrector and the second communication pad of the second shake corrector are connected in common to the data output port.

The first shake corrector may further include a first timing control port configured to receive or output a timing control signal determining a first gyro data-read interval of the first shake corrector and a second gyro data-read interval of the second shake corrector, the second shake corrector may further include a second timing control port configured to receive or output the timing control signal determining the first gyro data-read interval of the first shake corrector and the second gyro data-read interval of the second shake corrector, the first shake corrector may be further configured to read the gyro data during the first gyro data-read interval, and the second shake corrector may be further configured to read the gyro data during the second gyro data-read interval.

The first timing control port of the first shake corrector and the second timing control port of the second shake corrector may be connected to each other.

The gyro data-read interval of the first shake corrector and the gyro data-read interval of the second shake corrector may be determined based on a high-level interval and a low-level interval of the timing control signal.

The first communication pad of the first shake corrector connected to the data output port may be further configured to be activated during the high-level interval of the timing control signal, and the second communication pad of the second shake corrector connected to the data output port may be further configured to be deactivated during the high-level interval of the timing control signal.

The first communication pad of the first shake corrector connected to the data output port may be further configured to be deactivated during the low-level interval of the timing control signal, and the second communication pad of the second shake corrector connected to the data output port may be further configured to be activated during the low-level interval of the timing control signal.

The first shake corrector may be further configured to generate the timing control signal.

The first shake corrector may be further configured to periodically generate a first interrupt signal, and periodically switch a state of the timing control signal between a high-level state and a low-level state based on the periodically generated first interrupt signal.

The first shake corrector may be further configured to apply the periodically generated first interrupt signal to the first communication pad of the first shake corrector connected to the data output port, and the first communication pad of the first shake corrector may be further configured to be alternately activated and deactivated by the periodically generated first interrupt signal.

The first shake corrector may be further configured to output the timing control signal through the first timing control port of the first shake corrector, and the second shake corrector may be further configured to receive the timing control signal through the second timing control port of the second shake corrector.

The second shake corrector may be further configured to periodically generate a second interrupt signal at a switching timing of a high-level state and a low-level state of the timing control signal.

The second shake corrector may be further configured to apply the periodically generated second interrupt signal to the second communication pad of the second shake corrector connected to the data output port, and the second communication pad of the second shake corrector may be further configured to be alternately activated and deactivated by the periodically generated second interrupt signal.

Each of the first communication pad of the first shake corrector and the second communication pad of the second shake may include an input/output port connected to the data output port; an output port; an input port; an interrupt port configured to receive a control signal; an input buffer having an input connected to the input/output port and an output connected to the input port; and an output buffer having an input connected to the output port, an output connected to the input/output port, and a control input connected to the interrupt port, the control signal applied to the interrupt port may determine an active operation and an inactive operation of the output buffer, and the output buffer may be configured to receive the control signal from the interrupt port through the control input of the output buffer, connect the output port to the input/output port during the active operation of the output buffer, and disconnect the output port from the input/output port during the inactive operation of the output buffer.

In another general aspect, a camera module includes a gyro sensor configured to output gyro data; a first camera module including a first lens barrel, and a first shake corrector configured to move the first lens barrel in a direction perpendicular to an optical axis of the first lens barrel based on the gyro data; and a second camera module including a second lens barrel, and a second shake corrector configured to move the second lens barrel in a direction perpendicular to an optical axis of the second lens barrel based on the gyro data, wherein the first shake corrector is further configured to read the gyro data during a first gyro data-read interval, and the second shake corrector is further configured to read the gyro data during a second gyro data-read interval that is different from the first gyro data-read interval.

The gyro sensor may further include a communication line connected to the gyro sensor and branching out into a first branch connected to the first shake corrector and a second branch connected to the second shake corrector, the gyro sensor may be further configured to operate as a slave device, and the first shake corrector and the second shake corrector each may be further configured to operate as a master device configured to control the gyro device configured to operate as a slave device through the communication line.

The first shake corrector may include a first timing control port configured to receive or output a timing control signal determining the first gyro data-read interval and the second gyro data-read interval, and the second shake corrector may include a second timing control port configured to receive or output the timing control signal determining the first gyro data-read interval and the second gyro data-read interval.

In another general aspect, a camera module includes a gyro sensor configured to output gyro data indicative of a movement of the camera module; a first camera module including a first lens barrel, and a first shake corrector configured to read the gyro data and move the first lens barrel to perform an optical image stabilization (OIS) function based on the gyro data read by the first shake corrector; and a second camera module including a second lens barrel, and a second shake corrector configured to read the gyro data and move the second lens barrel to perform an OIS function based on the gyro data read by the second shake corrector, wherein the first shake corrector is further configured to prevent the first shake corrector from reading the gyro data while the second shake corrector is reading the gyro data, and the second shake corrector is further configured to prevent the second shake corrector from reading the gyro data while the first shake corrector is reading the gyro data.

The first shake corrector may include a first timing control port configured to receive or output a timing control signal indicating when the first shake corrector is to read the gyro data and when the second shake corrector is to read the gyro data, and a first communication pad configured to enable the first shake corrector to read the gyro data in response to the timing control signal indicating that the first shake corrector is to read the gyro data, and prevent the first shake corrector from reading the gyro data in response to the timing control signal indicating that the second shake corrector is to read the gyro data; and the second shake corrector may include a second timing control port configured to receive or output the timing control signal, and a second communication pad configured to enable the second shake corrector to read the gyro data in response to the timing control signal indicating that the second shake corrector is to read the gyro data, and prevent the second shake corrector from reading the gyro data in response to the timing control signal indicating that the first shake corrector is to read the gyro data.

The first shake corrector may be further configured to generate the timing control signal and output the timing control signal to the second shake corrector, and the second shake corrector may be further configured to receive the timing control signal from the first shake corrector; or the second shake corrector may be further configured to generate the timing control signal and output the timing control signal to the first shake corrector, and the first shake corrector may be further configured to receive the timing control signal from the second shake corrector.

The first shake corrector may include a first timing control port and a first communication pad; the second shake corrector may include a second timing control port connected to the first timing control port and a second communication pad; the first shake corrector may be further configured to periodically generate a first interrupt signal, apply the first interrupt signal to the first communication pad, generate a timing control signal that periodically changes between a high-level state and a low-level state in response to the first interrupt signal, and output the timing control signal through the first timing control port to the second timing control port; the second shake corrector may be further configured to receive the timing control signal through the second timing control port, periodically generate a second interrupt signal in response to the timing control signal, and apply the second interrupt signal to the second communication port; the first communication port may be configured to alternately enable the first shake corrector to read the gyro data and prevent the first shake corrector from reading the gyro data in response to the first interrupt signal; the second communication port may be configured to alternately enable the second shake corrector to read the gyro data and prevent the second shake corrector from reading the gyro data in response to the second interrupt signal; and the first communication port and the second communication port may be synchronized by the first interrupt signal, the timing control signal, and the second interrupt signal so that the first communication port enables the first shake corrector to read the gyro data while the second communication port prevents the second shake corrector from reading the gyro data, and so that the first communication port prevents the first shake corrector from reading the gyro data while the second communication port enables the second shake corrector to read the gyro data.

The first shake corrector may include a first timing control port and a first communication pad; the second shake corrector may include a second timing control port connected to the first timing control port and a second communication pad; the second shake corrector may be further configured to periodically generate a first interrupt signal, apply the first interrupt signal to the second communication pad, generate a timing control signal that periodically changes between a high-level state and a low-level state in response to the first interrupt signal, and output the timing control signal through the second timing control port to the first timing control port; the first shake corrector may be further configured to receive the timing control signal through the first timing control port, periodically generate a second interrupt signal in response to the timing control signal, and apply the second interrupt signal to the first communication port; the second communication port may be configured to alternately enable the second shake corrector to read the gyro data and prevent the second shake corrector from reading the gyro data in response to the first interrupt signal; the first communication port may be configured to alternately enable the first shake corrector to read the gyro data and prevent the first shake corrector from reading the gyro data in response to the second interrupt signal; and the second communication port and the first communication port may be synchronized by the first interrupt signal, the timing control signal, and the second interrupt signal so that the second communication port enables the second shake corrector to read the gyro data while the first communication port prevents the first shake corrector from reading the gyro data, and so that the second communication port prevents the second shake corrector from reading the gyro data while the first communication port enables the first shake corrector to read the gyro data.

Other features and aspects will be apparent from the following detailed description, the drawings, and the claims.

BRIEF DESCRIPTION OF DRAWINGS

FIG. 3 illustrates an example of a timing control signal.

FIG. 4 illustrates an example of a communication pad provided in each of a first shake corrector and a second shake corrector of FIG. 2.

FIG. 5A illustrates an example of a timing control signal, and FIGS. 5B and 5C illustrate examples of an interrupt signal.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
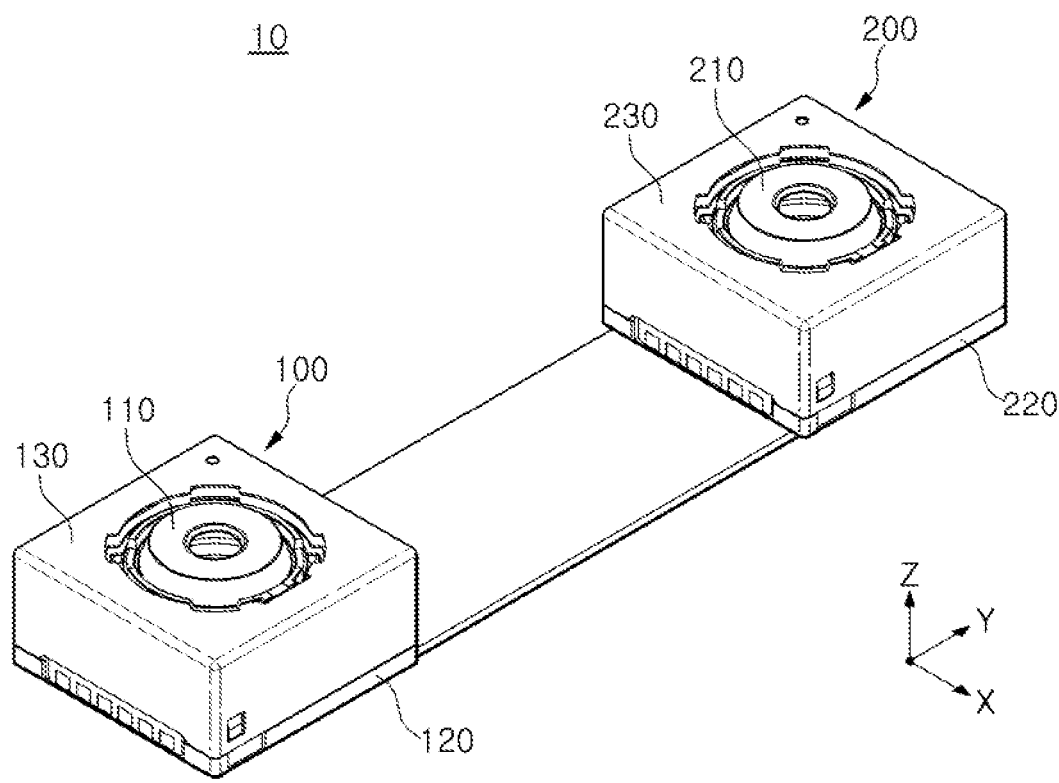
FIG. 1 is a perspective view of an example of a dual camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is a perspective view of an example of a dual camera module.

Referring to FIG. 1, a dual camera module 10 includes a first camera module 100 including a first lens barrel 110, a housing 120 accommodating the first lens barrel 110 therein, and a case 130 coupled to the housing 120; and a second camera module 200 including a second lens barrel 210, a housing 220 accommodating the lens barrel 210 therein, and a case 230 coupled to the housing 220. The first camera module 100 and the second camera module 200 may be mounted on a single printed circuit board, or may be mounted on different printed circuit boards.

Since the second camera module 200 is similar to the first camera module 100 in terms of its configuration, a detailed description of the first camera module 100 will be provided, which is also applicable to the second camera module 200.

The first lens barrel 110 has a hollow cylindrical shape capable of accommodating therein a plurality of lenses (not shown) for capturing an image of a subject, and the plurality of lenses are mounted in the first lens barrel 110 along an optical axis. A number of lenses, being two or more, mounted in the first lens barrel 110 may vary based on a target specification of the lens barrel 110. The lenses may have optical characteristics, such as the same refractive index or different refractive indices.

The first camera module 100 further includes an image sensor (not shown) configured to convert light entering through the lens barrel 110 into an electric signal. The image sensor may be a charge-coupled device (CCD) or a complementary metal-oxide-semiconductor (CMOS) device. The electric signal converted by the image sensor is output as an image through a display unit of a portable electronic device. The image sensor is mounted on a printed circuit board and electrically connected to the printed circuit board by wire bonding.

An infrared filter may be provided on top of or in front of the image sensor. The infrared filter filters infrared light from the light entering through the lens barrel 110.

The lens barrel 110 and an actuator (not shown) are accommodated in the housing 120. For example, the housing 120 has an open top and an open bottom, and the lens barrel 110 and the actuator are accommodated in an inner space of the housing 120. In a lower part of the housing 120, an image sensor is disposed. The case 130 is coupled to the housing 120 to surround an external surface of the housing 120, thereby protecting internal components of the first camera module 100. Also, the case 130 serves to prevent electromagnetic waves generated by the camera module inside the portable electronic device from influencing other electronic components disposed therein. Also, since there are various electronic components, other than the camera module, mounted in the portable electronic device, the case 130 can prevent electromagnetic waves generated by these other electronic components from influencing the camera module.

The actuator of the camera module is configured to move the lens barrel 110 along an optical axis and in directions perpendicular to the optical axis. For example, the actuator moves the first lens barrel 110 in an optical axis direction (a Z-axis direction) to adjust focus, and the first lens barrel 110 in directions perpendicular to the optical axis to correct a shake when capturing an image. The actuator includes a focus adjuster configured to adjust focus and a shake corrector configured to correct a shake.

Figure 2:
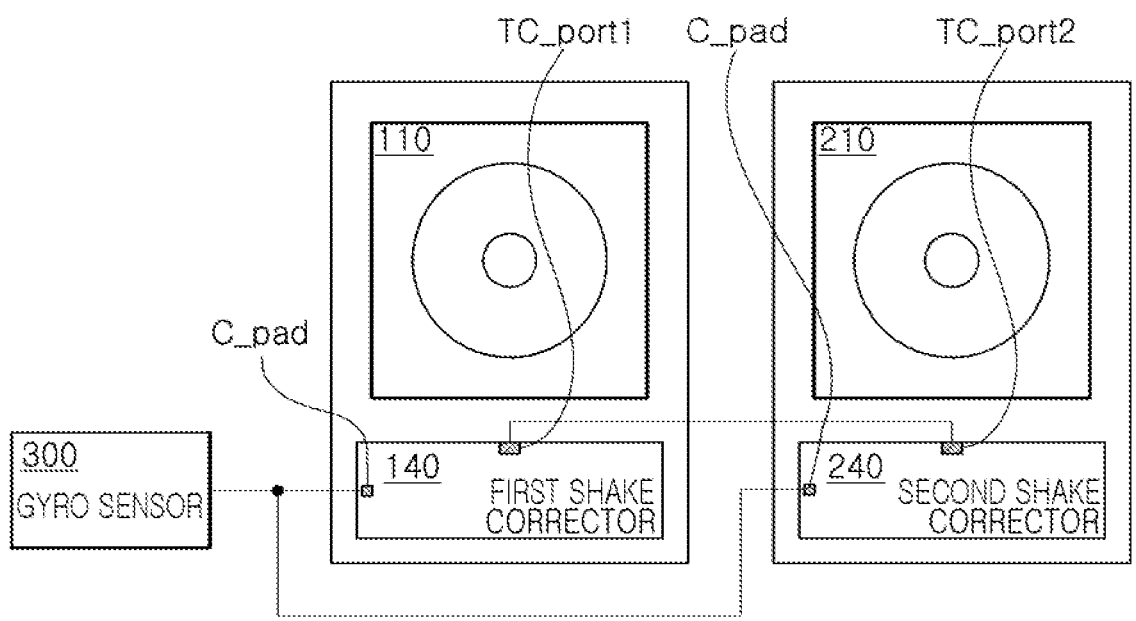
FIG. 2 is a block diagram of an example of a dual camera module.

FIG. 2 is a block diagram of an example of a dual camera module.

Referring to FIG. 2, a dual camera module 10 according to an example embodiment may include a first camera module 100 including a first lens barrel 110 and a first shake corrector 140 driving the first lens barrel 110 in a direction perpendicular to an optical axis, and a second camera module 200 including a second lens barrel 210 and a second shake corrector 240 driving the second lens barrel 210 in a direction perpendicular to the optical axis.

The first shake corrector 140 includes a dual-channel driver integrated circuit (IC) for driving the first lens barrel 110 in two directions perpendicular to the optical axis, and the second shake corrector 240 includes a dual-channel driver IC for driving the second lens barrel 210 in two directions perpendicular to the optical axis. For example, the first shake corrector 140 and the second shake corrector 240 may be each realized as an IC. In addition, although not illustrated in FIG. 2, the first shake corrector 140 and the second shake corrector 240 each include driving magnets, driving coils, position detectors, and driving circuits for applying driving currents to the driving coils in response to driving signals output from the dual-channel driver ICs.

The first shake corrector 140 and the second shake corrector 240 are connected to a gyro sensor 300.

The gyro sensor 300 is disposed inside a camera module or an electronic device in which the camera module is employed. The gyro sensor 300 detects a shaking or other movement of the camera module or the electronic device, and provides gyro data containing acceleration data and angular velocity data of the shaking or other movement to the first shake corrector 140 and the second shake corrector 240.

The first shake corrector 140 and the second shake corrector 240 respectively move the first lens barrel 110 and the second lens barrel 210 in a direction perpendicular to the optical axis according to the acceleration data and the angular velocity data contained in the gyro data.

The gyro sensor 300 is connected to the first shake corrector 140 and the second shake corrector 240 through a communication line. For example, the gyro sensor 300 is connected to the first shake corrector 140 and the second shake corrector 240 through a serial interface line. Although FIG. 2 shows the communication line or serial interface line as a single line for convenience of illustration and description, the communication line or serial interface line may include two or more lines depending on a type of the communication line or serial interface line.

Referring to FIG. 2, the first shake corrector 140 and the second shake corrector 240 are connected in common to a data output port of the gyro sensor 300 by a communication line connected to the gyro sensor 300 branching out into a first branch connected to the first shake corrector 140 and a second branch connected to the second shake corrector 240.

The first shake corrector 140 and the second shake corrector 240 are each operated as a master device, and the gyro sensor 300 is operated as a slave device. The first shake corrector 140 and the second shake corrector 240 each operating as a master device control the gyro sensor 300 operating as a slave device through the communication line. The first shake corrector 140 and the second shake corrector 240 periodically read gyro data from the gyro sensor 300.

In a master/slave control scheme, if multiple master devices are connected to one slave device, there may be conflicts between instructions provided by the master devices to the slave device unless measures are taken to prevent such conflicts. For example, if the first shake corrector 140 and the second shake corrector 240 each operating as a master device are connected to the single gyro sensor 300 operating as a slave device, there may be difficulties in allocating gyro data-read timings between the first shake corrector 140 and the second shake corrector 240, which may lead to a conflict between a gyro data-read timing of the first shake corrector 140 and a gyro data-read timing of the second shake corrector 240.

In one example, the first shake corrector 140 and the second shake corrector 240 are connected to each other through a communication line to control read timings of the first shake corrector 140 and the second shake corrector 240.

For example, the first shake corrector 140 and the second shake corrector 240 each include a predetermined timing control port TC_port, and a first timing control port TC_port1 of the first shake corrector 140 and a second timing control port TC_port2 of the second shake corrector 240 are connected to each other through a communication line. Based on a timing control signal input/output from the first timing control port TC_port1 of the first shake corrector 140 and the second timing control port TC_port2 of the second shake corrector 240, gyro data-read periods of the first shake corrector 140 and the second shake corrector 240 are determined. Although FIG. 2 shows the communication line between the first timing control port TC_port1 of the first shake corrector 140 and the second timing control port TC_port2 of the second shake corrector 240 as a single line for convenience of illustration and description, the communication line may include two or more lines depending on a type of the communication line.

For example, the first timing control port TC_port1 of the first shake corrector 140 and the second timing control port TC_port2 of the second shake corrector 240 each may be implemented as a general-purpose input/output port (GPIO). At any given time, one of the first timing control port TC_port1 of the first shake corrector 140 and the second timing control port TC_port2 of the second shake corrector 240 is operated as an output port, and the other one thereof is operated as an input port.

Hereinbelow, for convenience of description, a description will be provided for a case in which the first timing control port TC_port1 of the first shake corrector 140 is operated as an output port, and the second timing control port TC_port2 of the second shake corrector 240 is operated as an input port.

In the example described above, the timing control ports TC_port1 and TC_port2 are described as being GPIO ports. However, other types of communication ports may be used as the timing control ports TC_port1 and TC_port2.

FIG. 3 illustrates an example of a timing control signal.

Referring to FIG. 3, a timing control signal Timing Control Signal has a high level and a low level that are periodically repeated. Assuming the first timing control port TC_port1 of the first shake corrector 140 to be an output port and the second timing control port TC_port2 of the second shake corrector 240 to be an input port, the timing control signal is generated in the first shake corrector 140 and provided to the second shake corrector 240.

When the timing control signal is at the high level, the first shake corrector 140 reads gyro data from the gyro sensor 300, and when the timing control signal is at the low level, the second shake corrector 240 reads gyro data from the gyro sensor 300. Accordingly, a first read interval Read Interval 1 for the first shake corrector 140 to read the gyro data from the gyro sensor 300 is determined by the timing control signal at the high level, and a second read interval Read Interval 2 for the second shake corrector 240 to read the gyro data from the gyro sensor 300 is determined by the timing control signal at the low level.

Therefore, in the example described above, a conflict is avoided between a gyro data-read timing of the first shake corrector 140 and a gyro data-read timing of the second shake corrector 240.

Hereinbelow, a specific configuration and method for dividing the gyro data-read timing of the first shake corrector 140 and the gyro data-read timing of the second shake corrector 240 will be described in greater detail.

FIG. 4 illustrates an example of a communication pad provided in each of a first shake corrector and a second shake corrector of FIG. 2.

A communication pad C_pad illustrated in FIG. 4 is provided in each of the first shake corrector 140 and the second shake corrector 240 to enable the first shake corrector 140 and the second shake corrector 240 to be connected to the gyro sensor 300 through a communication line, which may be a serial interface line.

Referring to FIG. 4, the communication pad C_pad includes an input port, an output port, an input/output port, an input buffer connected between the input/output port and the input port, an output buffer connected between the input/output port and the output port, and an interrupt port. The input buffer and the output buffer control a transmission/reception direction of a signal or data in a predetermined direction. For example, the input buffer enables a signal or data input through the input/output port to be output through the input port, and the output buffer enables a signal or data input through the output port to be output through the input/output port. The interrupt port controls activation or deactivation of the output buffer by applying a control signal to a control input of the output buffer, thereby determining activation or deactivation of the entire communication pad C_pad.

The input port and the output port of the first shake corrector 140 are directly connected to the first shake corrector 140, the input port and the output port of the second shake corrector 240 are directly connected to the second shake corrector 240, and the input/output port of each of the first shake corrector 140 and the second shake corrector 240 is connected to the gyro sensor 300 through the communication line, which may be a serial interface line.

At the gyro data-read timing of the first shake corrector 140 for reading gyro data from the gyro sensor 300, the first shake corrector 140 outputs a data request signal through the output port of the first shake corrector 140, and the output data request signal is transferred to the gyro sensor 300 through the output buffer and the input/output port of the first shake corrector 140. The gyro sensor 300, in response to the data request signal, inputs the gyro data to the input/output port of the first shake corrector 140, and the input gyro data is transferred to the first shake corrector 140 through the input buffer and the input port of the first shake corrector 140. These operations are performed by the communication pad C_pad of the first shake corrector 140.

Also, at the gyro data-read timing of the second shake corrector 240 for reading gyro data from the gyro sensor 300, the second shake corrector 240 outputs a data request signal through the output port of the second shake corrector 240, and the output data request signal is transferred to the gyro sensor 300 through the output buffer and the input/output port of the second shake corrector 240. The gyro sensor 300, in response to the data request signal, inputs the gyro data to the input/output port of the second shake corrector 240, and the input gyro data is transferred to the second shake corrector 240 through the input buffer and the input port of the second shake corrector 240. These operations are performed by the communication pad C_pad of the second shake corrector 240.

At the gyro data-read timing of the first shake corrector 140 for reading gyro data from the gyro sensor 300, a data request operation of the second shake corrector 240 needs to be restricted, and at the gyro data-read timing of the second shake corrector 240 for reading gyro data from the gyro sensor 300, a data request operation of the first shake corrector 140 needs to be restricted.

In one example, the timing control signal described above is provided to the interrupt port, thereby controlling an operation of the output buffer.

For example, assuming that the first shake corrector 140 reads gyro data from the gyro sensor 300 when the timing control signal is at the high level, and the second shake corrector 240 reads gyro data from the gyro sensor 300 when the timing control signal is at the low level, when a timing control signal of the high level is provided to the interrupt port of the first shake corrector 140, the output buffer of the first shake corrector 140 is activated to enable the output buffer of the first shake corrector 140 to output a data request signal received from the output port of the first shake corrector 140 to the gyro sensor 300 through the input/output port of the first shake corrector 140, and when the timing control signal of the high level is provided to the interrupt port of the second shake corrector 240, the output buffer of the second shake corrector 240 is deactivated to prevent a data request signal received from the output port of the second shake corrector 240 from being output to the gyro sensor 300 through the output buffer and the input/output port of the second shake corrector 240.

Also, when a timing control signal of the low level is provided to the interrupt port of the first shake corrector 140, the output buffer of the first shake corrector 140 is deactivated to prevent a data request signal received from the output port of the first shake corrector 140 from being output to the gyro sensor 300 through the output buffer and the input/output port of the first shake corrector 140, and when the timing control signal of the low level is provided to the interrupt port of the second shake corrector 240, the output buffer of the second shake corrector 240 is activated to enable the output buffer of the second shake corrector 240 to output a data request signal received from the output port of the second shake corrector 240 to the gyro sensor 300 through the input/output port of the second shake corrector 240.

Although a timing control signal has been described as being provided to the interrupt port in the examples described above, in other examples, an interrupt signal based on which a timing control signal is generated, or an interrupt signal generated based on a timing control signal, is provided to the interrupt port.

An example in which an interrupt signal is provided to the interrupt port will now be described in greater detail.

FIG. 5A illustrates an example of a timing control signal, and FIGS. 5B and 5C illustrate examples of interrupt signals.

FIG. 5A illustrates a timing control signal that is output from the first timing control port TC_port1 of the first shake corrector 140 and is then input to the second timing control port TC_port2 of the second shake corrector 240, FIG. 5B illustrates a first interrupt signal Interrupt Signal 1 based on which the timing control signal of FIG. 5A is generated, and FIG. 5C illustrates a second interrupt signal Interrupt Signal 2 generated based on the timing control signal of FIG. 5A.

FIG. 5A illustrates a timing control signal that is output from the first timing control port TC_port1 of the first shake corrector 140, and is then input to the second timing control port TC_port2 of the second shake corrector 240.

As described above, when the timing control signal is at the high level, the first shake corrector 140 reads gyro data from the gyro sensor 300, and when the timing control signal is at the low level, the second shake corrector 240 reads gyro data from the gyro sensor 300.

FIG. 5B illustrates a first interrupt signal based on which the timing control signal of FIG. 5A is generated. The first shake corrector 140 periodically generates the first interrupt signal having a predetermined duty cycle for use in generating the timing control signal. The first shake corrector 140 may include a timer or a clock generator to periodically generate the first interrupt signal having the predetermined duty cycle.

The first shake corrector 140 generates the timing control signal based on the first interrupt signal. The first shake corrector 140 changes a state of the timing control signal at every falling edge of the first interrupt signal. For example, the first shake corrector 140 changes the state of the timing control signal from the low level to the high level at a first falling edge of the first interrupt signal, changes the state of the timing control signal from the high level to the low level at a second falling edge of the first interrupt signal, and changes the state of the timing control signal from the low level to the high level at a third falling edge of the first interrupt signal as illustrated in FIGS. 5A and 5B. The timing control signal generated in the first shake corrector 140 is output to the second timing control port TC_port2 of the second shake corrector 140 through the first timing control port TC_port1 of the first shake corrector 140.

The first interrupt signal is provided to the interrupt port of the communication pad C_pad provided in the first shake corrector 140. Due to the first interrupt signal being periodically generated, the output buffer of the first shake corrector 140 is periodically switched on and off.

For example, the output buffer of the first shake corrector 140 is switched on or off at every falling edge of the first interrupt signal. Since the output buffer of the first shake corrector 140 is switched on or off at every falling edge of the first interrupt signal, the output buffer of the first shake corrector 140 is switched on at every odd-numbered falling edge of the first interrupt signal, and is switched off at every even-numbered falling edge of the first interrupt signal. Alternatively, the output buffer of the first shake corrector 140 is switched on at every even-numbered falling edge of the first interrupt signal, and is switched off at every odd-numbered falling edge of the first interrupt signal.

FIG. 5C illustrates a second interrupt signal generated based on the timing control signal.

Referring to FIG. 5C, the second shake corrector 240 generates a second interrupt signal based on the timing control signal. The second shake corrector 240 periodically generates a second interrupt signal having a predetermined duty cycle at every rising edge and falling edge of the timing control signal.

For example, as shown in FIG. 5C, the second shake corrector 240 generates the second interrupt signal having the predetermined duty cycle at a first rising edge of the timing control signal, at a first falling edge of the timing control signal, and at a second rising edge of the timing control signal. The second interrupt signal is provided to the interrupt port of the communication pad C_pad provided in the second shake corrector 240. Due to the second interrupt signal being periodically generated, the output buffer of the second shake corrector 240 is periodically switched off or on.

For example, the output buffer of the second shake corrector 240 is switched off or on at every rising edge of the second interrupt signal. Since the output buffer of the second shake corrector 240 is switched off or on at every rising edge of the second interrupt signal, the output buffer of the second shake corrector 240 is switched off at every odd-numbered rising edge of the second interrupt signal, and is switched on at every even-numbered falling edge of the second interrupt signal. Alternatively, the output buffer of the second shake corrector 240 is switched off at every even-numbered rising edge of the second interrupt signal, and is switched on at every off-numbered falling edge of the second interrupt signal. The output buffer of the second shake corrector 240 is off while the output buffer of the first shake corrector 140 is on, and is on while the output buffer of the first shake corrector 140 is off.

If the output buffer of the first shake corrector 140 is switched on at every odd-numbered falling edge of the first interrupt signal, the output buffer of the second shake corrector 240 is switched on at every even-numbered rising edge of the second interrupt signal. Alternatively, if the output buffer of the first shake corrector 140 is switched on at every even-numbered falling edge of the first interrupt signal, the output buffer of the second shake corrector 240 is switched on at every odd-numbered rising edge of the second interrupt signal.

Accordingly, as a result of the operations described above, when the timing control signal is at the high level, the first shake corrector 140 reads gyro data from the gyro sensor 300, and when the timing control signal is at the low level, the second shake corrector 240 reads gyro data from the gyro sensor 300.

Figure 6:
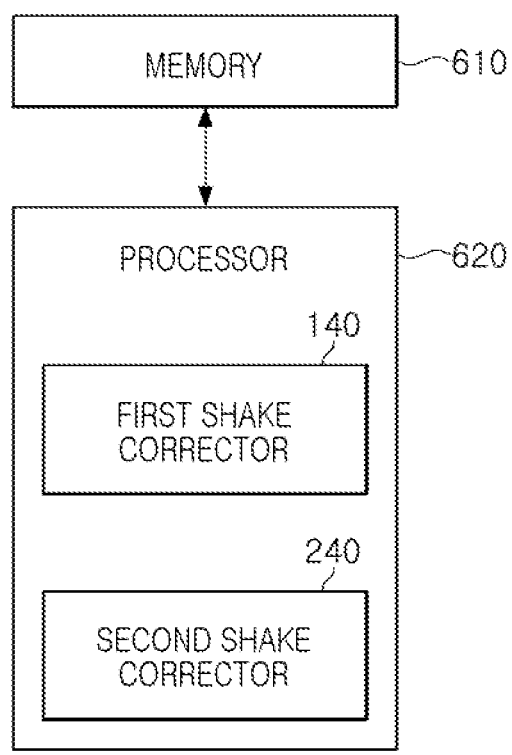
FIG. 6 is a block diagram illustrating an example of the first shake corrector and the second shake corrector of FIG. 2.

FIG. 6 is a block diagram illustrating an example of the first shake corrector and the second shake corrector of FIG. 2.

Referring to FIG. 6, a memory 610 stores instructions that, when executed by a processor 620, cause the processor 620 to perform the functions of the first shake corrector 140 and the second shake corrector 240 of FIG. 2. Thus, the processor 620 includes at least part of the first shake corrector 140 and the second shake corrector 240.

Although not illustrated in FIGS. 2 and 6, the first shake corrector 140 and the second shake corrector 240 include driving magnets, driving coils, position detectors, and driving circuits for applying driving currents to the driving coils. The processor 620 generates the timing control signal described above with respect to FIG. 3, or the first interrupt signal, the timing control signal, and the second interrupt signal described above with respect to FIG. 5, to control the reading of the gyro data from the gyro sensor 300 in FIG. 2 as described above, generates driving signals based on the gyro data, and applies the driving signals to the driving circuits to control the driving coils to move the lens barrels 110 and 210 of FIGS. 1 and 2 to perform an OIS function.

The first shake corrector 140 and the second shake corrector in FIG. 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application, as well as driving magnets, driving coils, and position detectors. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1 to 7 that perform the operations described in this application are performed by hardware components, or by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

The examples disclosed herein enable performance variations in an OIS function provided to a plurality of lenses in a camera module to be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
    a gyro sensor comprising a data output port and configured to provide gyro data through the data output port;
    a first camera module comprising a first lens barrel, and a first shake corrector configured to provide an optical image stabilization (OIS) function to the first lens barrel and comprising a first communication pad configured to receive the gyro data; and
    a second camera module comprising a second lens barrel, and a second shake corrector configured to provide an OIS function to the second lens barrel and comprising a second communication pad configured to receive the gyro data,
    wherein the first communication pad of the first shake corrector and the second communication pad of the second shake corrector are connected in common to the data output port,
    the first shake corrector is further configured to read the gyro data from the data output port, and
    the second shake corrector is further configured to read the gyro data from the data output port.

2. The camera module of claim 1, wherein the first shake corrector further comprises a first timing control port configured to receive or output a timing control signal determining a first gyro data-read interval of the first shake corrector and a second gyro data-read interval of the second shake corrector,
    the second shake corrector further comprises a second timing control port configured to receive or output the timing control signal determining the first gyro data-read interval of the first shake corrector and the second gyro data-read interval of the second shake corrector,
    the first shake corrector is further configured to read the gyro data during the first gyro data-read interval, and
    the second shake corrector is further configured to read the gyro data during the second gyro data-read interval.

3. The camera module of claim 2, wherein the first timing control port of the first shake corrector and the second timing control port of the second shake corrector are connected to each other.

4. The camera module of claim 2, wherein the gyro data-read interval of the first shake corrector and the gyro data-read interval of the second shake corrector are determined based on a high-level interval and a low-level interval of the timing control signal.

5. The camera module of claim 4, wherein the first communication pad of the first shake corrector connected to the data output port is further configured to be activated during the high-level interval of the timing control signal, and
    the second communication pad of the second shake corrector connected to the data output port is further configured to be deactivated during the high-level interval of the timing control signal.

6. The camera module of claim 4, wherein the first communication pad of the first shake corrector connected to the data output port is further configured to be deactivated during the low-level interval of the timing control signal, and
    the second communication pad of the second shake corrector connected to the data output port is further configured to be activated during the low-level interval of the timing control signal.

7. The camera module of claim 2, wherein the first shake corrector is further configured to generate the timing control signal.

8. The camera module of claim 7, wherein the first shake corrector is further configured to periodically generate a first interrupt signal, and periodically switch a state of the timing control signal between a high-level state and a low-level state based on the periodically generated first interrupt signal.

9. The camera module of claim 8, wherein the first shake corrector is further configured to apply the periodically generated first interrupt signal to the first communication pad of the first shake corrector connected to the data output port, and
the first communication pad of the first shake corrector is further configured to be alternately activated and deactivated by the periodically generated first interrupt signal.

10. The camera module of claim 7, wherein the first shake corrector is further configured to output the timing control signal through the first timing control port of the first shake corrector, and
the second shake corrector is further configured to receive the timing control signal through the second timing control port of the second shake corrector.

11. The camera module of claim 10, wherein the second shake corrector is further configured to periodically generate a second interrupt signal at a switching timing of a high-level state and a low-level state of the timing control signal.

12. The camera module of claim 11, wherein the second shake corrector is further configured to apply the periodically generated second interrupt signal to the second communication pad of the second shake corrector connected to the data output port, and
the second communication pad of the second shake corrector is further configured to be alternately activated and deactivated by the periodically generated second interrupt signal.

13. The camera module of claim 1, wherein each of the first communication pad of the first shake corrector and the second communication pad of the second shake comprises:
an input/output port connected to the data output port;
an output port;
an input port;
an interrupt port configured to receive a control signal applied to the interrupt port;
an input buffer having an input connected to the input/output port and an output connected to the input port; and
an output buffer having an input connected to the output port, an output connected to the input/output port, and a control input connected to the interrupt port,
the control signal applied to the interrupt port determines an active operation and an inactive operation of the output buffer, and
the output buffer is configured to receive the control signal from the interrupt port through the control input of the output buffer, connect the output port to the input/output port during the active operation of the output buffer, and disconnect the output port from the input/output port during the inactive operation of the output buffer.

14. The camera module of claim 1, wherein the first shake corrector is further configured to read the gyro data from the data output port while the second shake corrector is not reading the gyro data from the data output port, and
the second shake corrector is further configured to read the gyro data from the data output port while the first shake corrector is not reading the gyro data from the data output port.

15. A camera module comprising:
a gyro sensor configured to output gyro data;
a first camera module comprising a first lens barrel, and a first shake corrector configured to move the first lens barrel in a direction perpendicular to an optical axis of the first lens barrel based on the gyro data; and
a second camera module comprising a second lens barrel, and a second shake corrector configured to move the second lens barrel in a direction perpendicular to an optical axis of the second lens barrel based on the gyro data,
wherein the first shake corrector is further configured to read the gyro data during a first gyro data-read interval, and
the second shake corrector is further configured to read the gyro data during a second gyro data-read interval that is different from the first gyro data-read interval.

16. The camera module of claim 15, further comprising a communication line connected to the gyro sensor and branching out into a first branch connected to the first shake corrector and a second branch connected to the second shake corrector,
wherein the gyro sensor is further configured to operate as a slave device, and
the first shake corrector and the second shake corrector are each further configured to operate as a master device configured to control the gyro device configured to operate as a slave device through the communication line.

17. The camera module of claim 16, wherein the first shake corrector comprises a first timing control port configured to receive or output a timing control signal determining the first gyro data-read interval and the second gyro data-read interval, and
the second shake corrector comprises a second timing control port configured to receive or output the timing control signal determining the first gyro data-read interval and the second gyro data-read interval.

18. The camera module of claim 15, wherein the gyro sensor is a single gyro sensor configured to output the gyro data to a single communication line.

19. A camera module comprising:
a gyro sensor configured to output gyro data indicative of a movement of the camera module;
a first camera module comprising a first lens barrel, and a first shake corrector configured to read the gyro data and move the first lens barrel to perform an optical image stabilization (OIS) function based on the gyro data read by the first shake corrector; and
a second camera module comprising a second lens barrel, and a second shake corrector configured to read the gyro data and move the second lens barrel to perform an OIS function based on the gyro data read by the second shake corrector,
wherein the first shake corrector is further configured to prevent the first shake corrector from reading the gyro data while the second shake corrector is reading the gyro data, and
the second shake corrector is further configured to prevent the second shake corrector from reading the gyro data while the first shake corrector is reading the gyro data.

20. The camera module of claim 19, wherein the first shake corrector comprises:

a first timing control port configured to receive or output a timing control signal indicating when the first shake corrector is to read the gyro data and when the second shake corrector is to read the gyro data; and a first communication pad configured to enable the first shake corrector to read the gyro data in response to the timing control signal indicating that the first shake corrector is to read the gyro data, and prevent the first shake corrector from reading the gyro data in response to the timing control signal indicating that the second shake corrector is to read the gyro data; and the second shake corrector comprises:

a second timing control port configured to receive or output the timing control signal; and a second communication pad configured to enable the second shake corrector to read the gyro data in response to the timing control signal indicating that the second shake corrector is to read the gyro data, and prevent the second shake corrector from reading the gyro data in response to the timing control signal indicating that the first shake corrector is to read the gyro data.

21. The camera module of claim 20, wherein the first shake corrector is further configured to generate the timing control signal and output the timing control signal to the second shake corrector, and the second shake corrector is further configured to receive the timing control signal from the first shake corrector, or the second shake corrector is further configured to generate the timing control signal and output the timing control signal to the first shake corrector, and the first shake corrector is further configured to receive the timing control signal from the second shake corrector.

22. The camera module of claim 19, wherein the first shake corrector comprises a first timing control port and a first communication pad, the second shake corrector comprises a second timing control port connected to the first timing control port and a second communication pad, the first shake corrector is further configured to periodically generate a first interrupt signal, apply the first interrupt signal to the first communication pad, generate a timing control signal that periodically changes between a high-level state and a low-level state in response to the first interrupt signal, and output the timing control signal through the first timing control port to the second timing control port, the second shake corrector is further configured to receive the timing control signal through the second timing control port, periodically generate a second interrupt signal in response to the timing control signal, and apply the second interrupt signal to the second communication port, the first communication port is configured to alternately enable the first shake corrector to read the gyro data and prevent the first shake corrector from reading the gyro data in response to the first interrupt signal, the second communication port is configured to alternately enable the second shake corrector to read the gyro data and prevent the second shake corrector from reading the gyro data in response to the second interrupt signal, and the first communication port and the second communication port are synchronized by the first interrupt signal, the timing control signal, and the second interrupt signal so that the first communication port enables the first shake corrector to read the gyro data while the second communication port prevents the second shake corrector from reading the gyro data, and so that the first communication port prevents the first shake corrector from reading the gyro data while the second communication port enables the second shake corrector to read the gyro data.

23. The camera module of claim 19, wherein the first shake corrector comprises a first timing control port and a first communication pad, the second shake corrector comprises a second timing control port connected to the first timing control port and a second communication pad, the second shake corrector is further configured to periodically generate a first interrupt signal, apply the first interrupt signal to the second communication pad, generate a timing control signal that periodically changes between a high-level state and a low-level state in response to the first interrupt signal, and output the timing control signal through the second timing control port to the first timing control port, the first shake corrector is further configured to receive the timing control signal through the first timing control port, periodically generate a second interrupt signal in response to the timing control signal, and apply the second interrupt signal to the first communication port, the second communication port is configured to alternately enable the second shake corrector to read the gyro data and prevent the second shake corrector from reading the gyro data in response to the first interrupt signal, the first communication port is configured to alternately enable the first shake corrector to read the gyro data and prevent the first shake corrector from reading the gyro data in response to the second interrupt signal, and the second communication port and the first communication port are synchronized by the first interrupt signal, the timing control signal, and the second interrupt signal so that the second communication port enables the second shake corrector to read the gyro data while the first communication port prevents the first shake corrector from reading the gyro data, and so that the second communication port prevents the second shake corrector from reading the gyro data while the first communication port enables the first shake corrector to read the gyro data.

* * * * *